US009483636B2

(12) United States Patent
Iskin et al.

(10) Patent No.: US 9,483,636 B2
(45) Date of Patent: Nov. 1, 2016

(54) RUNTIME APPLICATION INTEGRITY PROTECTION

(71) Applicant: Microsoft Corporation, Redmond, WA (US)

(72) Inventors: Sermet Iskin, Issaquah, WA (US); Axel Andrejs, Sammamish, WA (US); Yunus Kilic, Redmond, WA (US); Joshua W. Dunn, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/157,926

(22) Filed: Jan. 17, 2014

(65) Prior Publication Data

US 2015/0205949 A1    Jul. 23, 2015

(51) Int. Cl.
  G06F 21/62    (2013.01)
  G06F 21/51    (2013.01)
  G06F 21/64    (2013.01)

(52) U.S. Cl.
  CPC .............. *G06F 21/51* (2013.01); *G06F 21/64* (2013.01)

(58) Field of Classification Search
  CPC ..... H04L 63/101; G06F 21/44; G06F 21/10; G06F 21/51; G06F 21/60
  See application file for complete search history.

(56) References Cited

U.S. PATENT DOCUMENTS

| 7,703,142 B1* | 4/2010 | Wilson et al. ................. 726/26 |
| 8,353,041 B2 | 1/2013 | Brown et al. |
| 8,510,796 B2 | 8/2013 | Srivastava et al. |
| 2008/0104699 A1 | 5/2008 | Gounares et al. |
| 2011/0029772 A1 | 2/2011 | Fanton et al. |
| 2011/0179477 A1 | 7/2011 | Starnes et al. |
| 2013/0024929 A1 | 1/2013 | Abraham et al. |
| 2013/0179984 A1* | 7/2013 | Kumar et al. .................. 726/26 |

OTHER PUBLICATIONS

Scandariato, et al., "Application-Oriented Trust in Distributed Computing", In Proceedings of Third International Conference on Availability, Reliability and Security, Mar. 4, 2008, 6 pages.
Wadhwa, et al.,"Arxan Technologies Kicks off Global Mobile App Integrity Protection", In Proceedings of RSA Conference, Feb. 20, 2013, 2 pages.
"A path toward Compliance, Risk Management, and Productivity", Published on: Jul. 2005, Available at: http://download.microsoft.com/download/d/3/f/d3f4fe20-b522-40b8-8975-eb6f3076bdfd/Access_Control_WP.doc, 21 pages.

* cited by examiner

*Primary Examiner* — Izunna Okeke
(74) *Attorney, Agent, or Firm* — Timothy Churna; Micky Minhas

(57) ABSTRACT

Systems, methods, apparatuses, and computer program products are described for checking the integrity of applications installed on a computing device and preventing the launch of applications that appear to have been tampered with or modified. In accordance with embodiments, the content of an application is validated at the time the application is to be launched, but before the launch has actually occurred. In accordance with additional embodiments, integrity protection can also be extended to content that is generated by an application (e.g., documents or other files generated by the application), thereby enabling applications to write their own files and data with the same degree of integrity protection.

19 Claims, 9 Drawing Sheets

RUNTIME APPLICATION INTEGRITY PROTECTION

BACKGROUND

An application store is a type of digital distribution platform that enables users to download application software (also referred to as "apps") for installation and execution upon their computing devices. The application store has become the de facto model for distributing application software to today's mobile computing devices, such as smart phones and tablet computers. This model is also increasingly being used to distribute software applications to non-mobile computing devices and platforms, such as desktop computers, televisions, set-top boxes, and gaming consoles.

A conventional application store may enable a user to browse through different categories of applications, view descriptive information and product reviews concerning applications, and purchase or otherwise obtain applications. Typically, when a user purchases or otherwise obtains an application from an application store, that application is automatically downloaded to and installed on the user's computing device. On many computing devices and platforms, access to an application store is provided via a built-in component of the operating system.

Within the application store ecosystem, there is always the threat that certain users will tamper with applications after such applications have been downloaded to and installed on their computing devices. A user may tamper with an application for various to avoid purchasing the application, to change the behavior of the application, or to gain a competitive advantage over other users who have installed and use the application, among other reasons.

By way of example, two versions of the same application may be distributed by an application store: a "free" version that can be obtained by users at no cost and that displays advertisements to generate revenue for the application's developer and a "premium" version that can be purchased by users for a price and that does not display advertisements. To ensure that advertisements are displayed, the free version of the application may have a configuration value associated therewith, denoted "Show Ads," that is set to "True." The premium version of the application may have the same configuration value associated therewith, but in the case of the premium version, "Show Ads" is set to "False" so that advertisements will not be displayed. A developer may store the configuration value in a file that is packaged and distributed with the application itself. For example, the developer may store the configuration value in an XML file called "settings.xml" which stores all of the configuration settings for the application and is packaged and distributed therewith.

In further accordance with this example, when the application is installed and then executed upon a user's computing device, the application will read the "Show Ads" configuration value from the "settings.xml" file and, based upon the value present in the file, will either display advertisements (because it is the "free" version) or not display advertisements (because it is the "premium" version).

If the "settings.xml" file is not properly protected, a user that has installed the "free" version of the application could discover the file and edit it such that the value for "Show Ads" could be changed from "True" to "False." This is harmful to the developer because now the "free" version of the application will not display the advertisements that both generate revenue for the developer and incent the user to purchase the "premium" version of the application if he or she is not interested in seeing the advertisements.

The primary form of protection applied to applications today is based on some form of obfuscation or encryption of the content of the application. For example, application content may be encrypted when the application is first installed on a user's computing device and then decrypted as needed when the application is later executed. However, once the encryption has been defeated (e.g., the encryption key is obtained) there are typically no further checks to prevent users from modifying their applications at will.

A similar issue exists with content that is generated by an application after it has been installed on a users' computing device. For example, some applications generate electronic receipts that are stored on a user's computing device when the user makes an in-application purchase. If the receipts are not properly protected, a user could discover a receipt and edit it in a manner that will cause the application to behave as if the user has purchased items that the user has not actually purchased.

SUMMARY

Systems, methods, apparatuses, and computer program products are described herein for checking the integrity of applications installed on a computing device and preventing the launch of applications that appear to have been tampered with or modified. In accordance with embodiments, the content of an application is validated at the time the application is to be launched, but before the launch has actually occurred. The integrity checking may advantageously be performed regardless of how the application launch is invoked. Furthermore, the integrity checking serves to protect application content in a manner that extends well beyond the conventional solution of encrypting the application content that is installed on the computing device.

In particular, a method for protecting application integrity at runtime is described herein. In accordance with the method, a request to create a process by which an application will be executed is received. The application comprises one of a plurality of application components (e.g., files in an application package). In response to receiving the request, it is determined whether an access control entry (ACE) exists in association with at least one of the application components, the ACE specifying one or more levels of permission required to perform one or more actions with respect to at least one of the application components. In response to determining that the ACE exists in association with the at least one of the application components, the process by which the application will be executed is created.

Depending upon the implementation of the foregoing method, determining if the ACE exists in association with at least one of the application components may include determining if any ACE exists in association with at least one of the application components or determining if an ACE that matches an expected ACE exists in association with at least one of the application components.

In one embodiment of the foregoing method, determining if the ACE exists in association with at least one of the application components includes determining if the ACE exists in association with a root directory of a folder in which the plurality of application components are stored.

The foregoing method may further include, in response to determining that the ACE does not exist in association with at least one of the application components, not creating the process by which the application will be executed, disabling the application from being launched in the future, and/or marking the application as requiring repair.

In another embodiment of the foregoing method, in response to determining that the ACE does not exist in association with at least one of the application components, the following steps are performed: determining a validity of each of the application components, and in response to determining that at least one of the application components is invalid, not creating the process by which the application will be executed. The method may further include, in response to determining that each of the application components is valid: creating the process by which the application will be executed and/or creating an ACE in association with at least one of the application components.

In an embodiment in which each of the application components comprises a file received as part of an application package, determining a validity of each of the application components may include determining a hash value for each of the files in the application package and comparing the determined hash value for each of the files in the application package to a corresponding hash value stored in a digitally-signed file included in the application package.

The foregoing method may further include performing the following operations in response to determining that the ACE does not exist in association with at least one of the application components: creating the process by which the application will be executed, determining a validity of each of the application components, and in response to determining that at least one of the application components is invalid, terminating the process.

The foregoing method may still further include allowing only protected processes to create an ACE in association with a resource, wherein a protected process comprises a process to which access by other processes is restricted.

A system that protects application integrity at runtime is also described herein. The system includes at least one processor and a memory. The memory stores computer program logic for execution by the at least one processor. The computer program logic including a plurality of components configured to perform operations when executed by the at least one processor. The plurality of components include a first operating system component. The first operating system component is configured to receive a request to create a process by which an application will be executed, the application comprising one file among a plurality of files in an application package, and in response to receiving the request, determine if an ACE exists in association with at least one of the files in the application package, the ACE specifying one or more levels of permission required to perform one or more actions with respect to at least one of the files in the application package. The first operating system component is further configured to, in response to determining that the ACE exists in association with the at least one of the files in the application package, create the process by which the application will be executed.

In an embodiment of the foregoing system, the plurality of components further includes a second operating system component that is configured to, in response to a determination that the ACE does not exist in association with at least one of the files in the application package, determine a validity of each of the files in the application package. In further accordance with this embodiment, the first operating system component is further configured to, in response to a determination that at least one of the files in the application package is invalid, not create the process by which the application will be executed and, in response to a determination that each of the files in the application package is valid, create the process by which the application will be executed.

In accordance with additional embodiments, integrity protection can also be extended to content that is generated by an application (e.g., documents or other files generated by the application), thereby enabling applications to write their own files and data with the same degree of integrity protection. In further accordance with such additional embodiments, an application may request that an operating system broker assign an ACE to content that is generated by the application at the time such content is first stored on a computing device. When the application subsequently needs to consume the application-generated content, it sends a request to access the content to the operating system broker, which will determine if an appropriate ACE is currently associated with the content. If an appropriate ACE is currently associated with the content, then the operating system broker will return the requested content to the application. However, if an appropriate ACE is not currently associated with the content, then the operating system broker may either not return the content or may return the content along with some indication that the content may have been tampered with.

In particular, a method for protecting the integrity of application-generated content is described herein. In accordance with the method, an operating system broker receives a request from an application to assign an ACE to content that has been created by the application, the ACE specifying one or more levels of permission required to perform one or more actions with respect to the content. In response to receiving the request, the operating system broker assigns the ACE to the content. In one embodiment, the operating system broker comprises a process to which access by other processes is restricted.

In an embodiment, the foregoing method further includes receiving by the operating system broker a request from the application to obtain the content, and in response to receiving the request from the application to obtain the content, determining if a valid ACE is assigned to the content. In further accordance with such an embodiment, the method may further include, in response to determining that a valid ACE is assigned to the content, providing the content to the application and, in response to determining that a valid ACE is not assigned to the content, not providing the content to the application or providing the content to the application along with an indication that the content may have been tampered with.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 6:
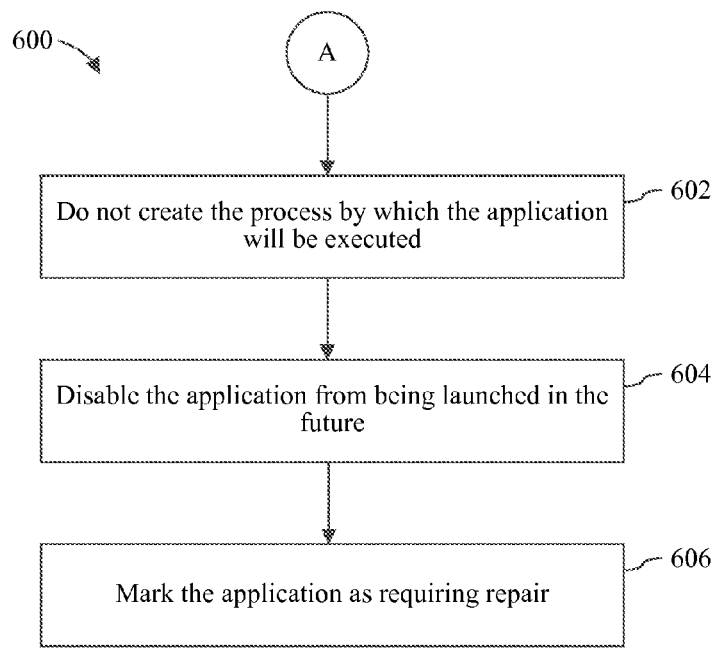
Figure 7:
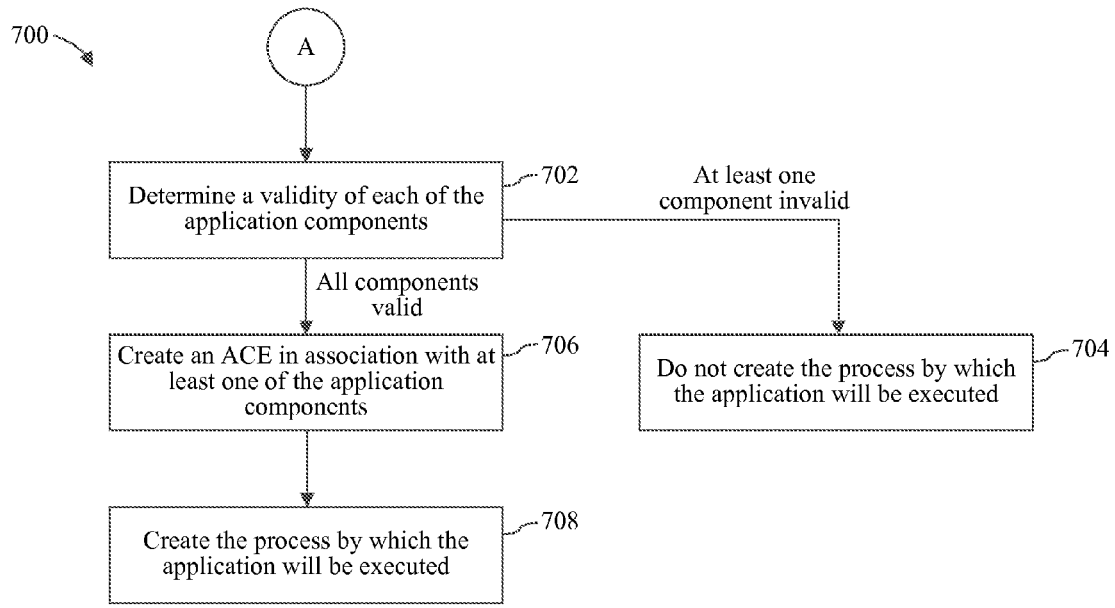
Figure 8:
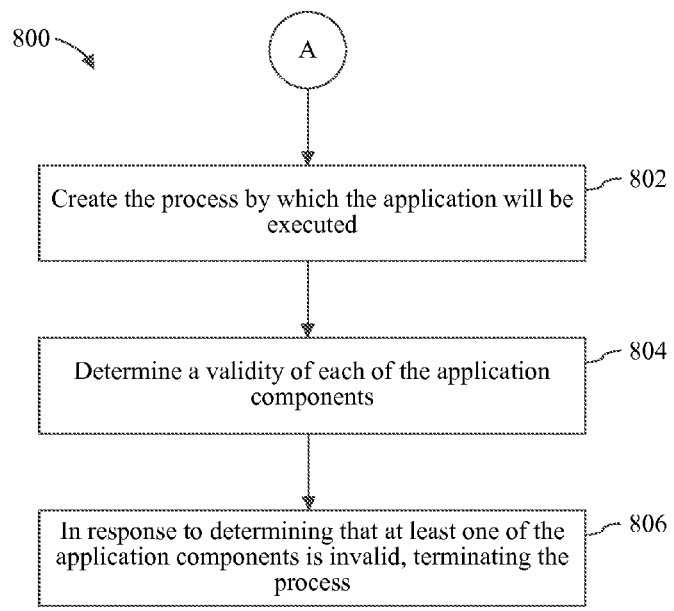

FIGS. 6, 7 and 8 each depict a flowchart of steps that may be performed in response to determining that an ACE does not exist in association with at least one application component in accordance with embodiments.

Figure 9:
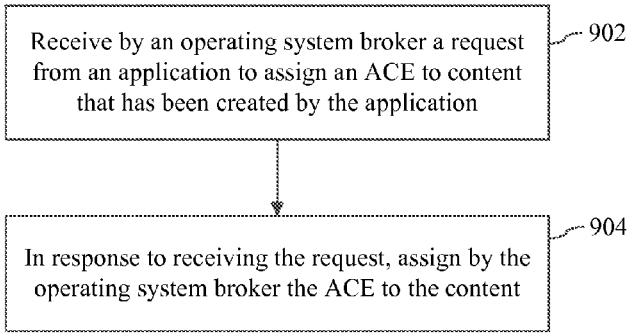

FIG. 9 depicts a flowchart of a method by which an operating system broker may operate to protect the integrity of application-generated content in accordance with an embodiment.

Figure 10:
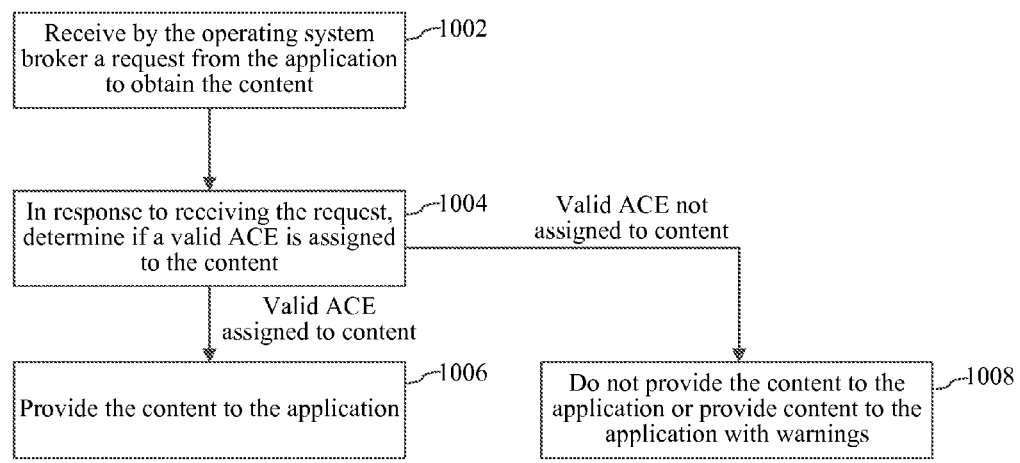

FIG. 10 depicts a flowchart of a method by which an operating system broker may further operate to protect the integrity of application-generated content in accordance with an embodiment.

Figure 11:
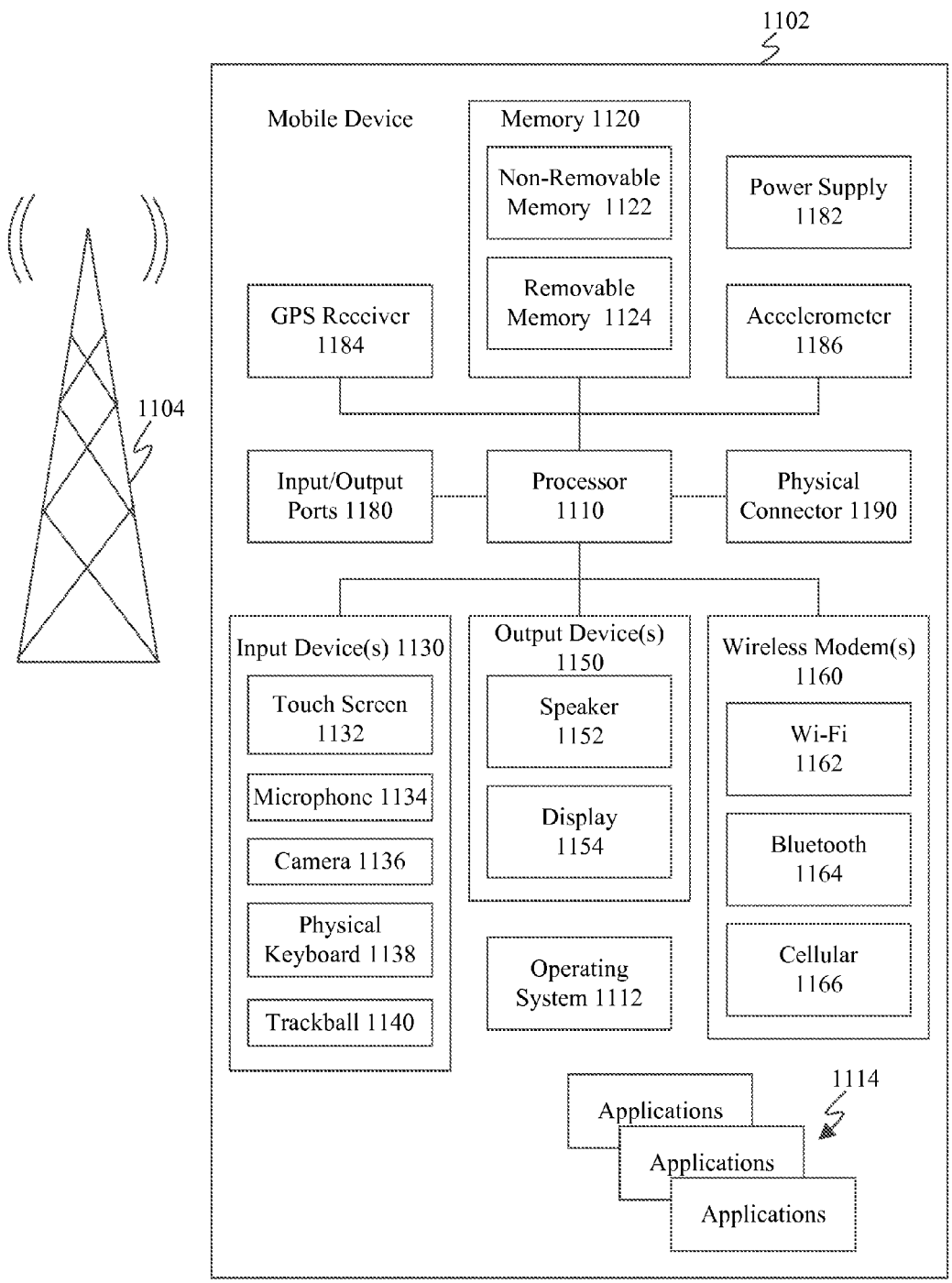

FIG. 11 is a block diagram of an example mobile device that may be used to implement various embodiments.

Figure 12:
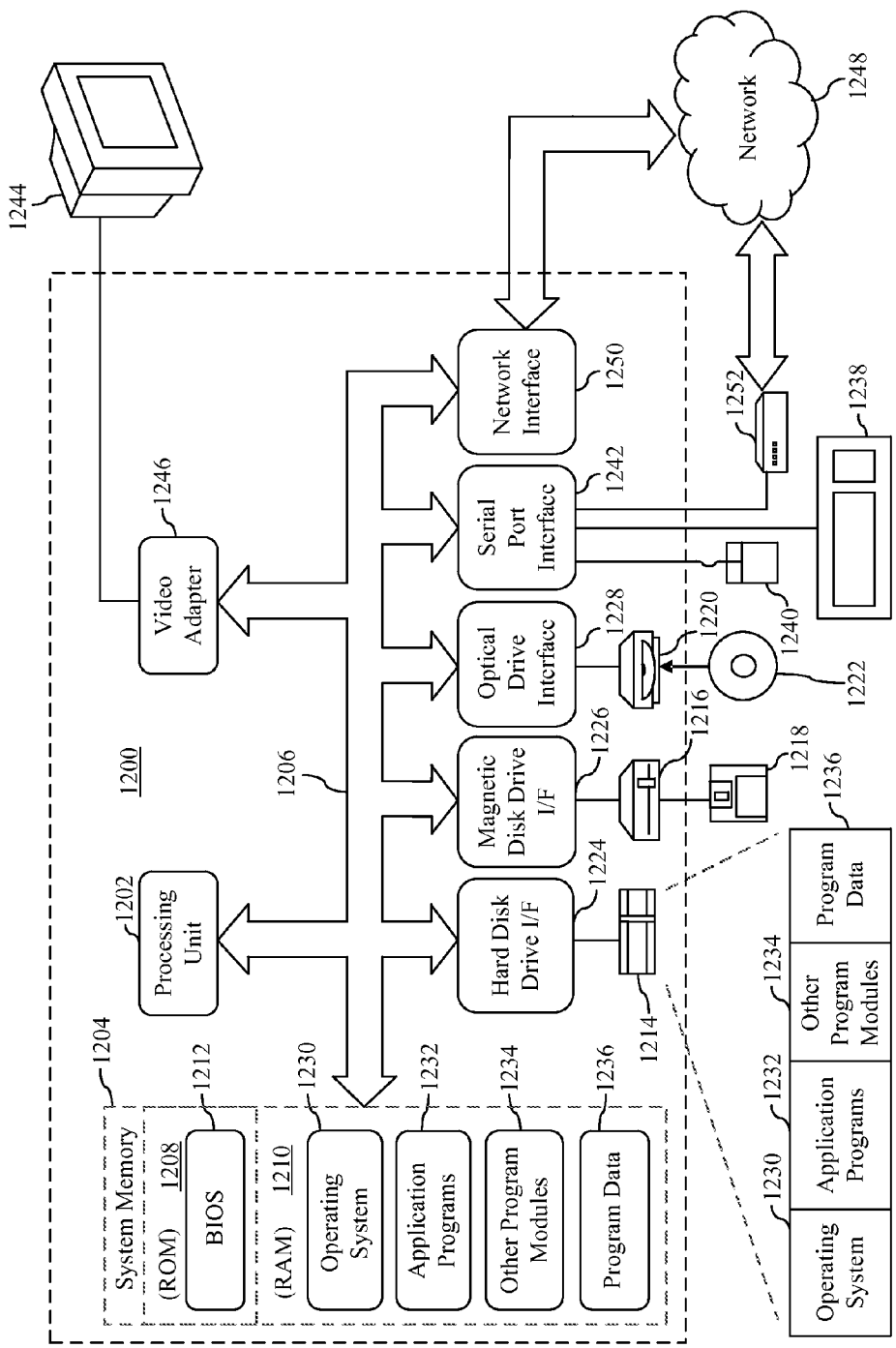

FIG. 12 is a block diagram of an example processor-based computer system that may be used to implement various embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods, apparatuses, and computer program products are described herein for checking the integrity of applications installed on a computing device and preventing the launch of applications that appear to have been tampered with or modified. In accordance with embodiments, the content of an application is validated at the time the application is to be launched, but before the launch has actually occurred. For this reason, the validation process is also referred to herein as "runtime integrity protection." The integrity checking may advantageously be performed regardless of how the application launch is invoked (e.g., direct launch, share, protocol launch). Furthermore, the integrity checking serves to protect application content in a manner that extends well beyond the conventional solution of encrypting the application content that is installed on the computing device.

In accordance with particular embodiments, the method of checking is dependent upon whether an access control entry (ACE) has been associated with one or more of an application's components. Such an ACE can only be associated with the application component(s) by a protected process, wherein a protected process is a process to which access by other processes is restricted. The protected process may include an operating system deployment service used to install the application on the computing device and the ACE may be associated with the application component(s) by associating the ACE with a root directory of a file system folder in which the application component(s) are stored. Prior to creating and launching a process for executing an application, an operating system launching service may determine if an ACE has been associated with one or more of the application's components. If the ACE is missing, or if the ACE does not match an expected ACE, then the launching service will fail to create the application's process and may also disable the application from further launch attempts in the future.

In accordance with additional embodiments, a similar level of protection that is provided for the components of an application can also be extended to content that is generated by an application (e.g., documents or other files generated by the application), thereby enabling applications to write their own files and data with the same degree of integrity protection. In further accordance with such additional embodiments, an application may request that an operating system broker assign an ACE to content that is generated by the application at the time such content is first stored on a computing device. The operating system broker may comprise a protected process. When the application subsequently needs to consume the application-generated content, it sends a request to access the content to the operating system broker, which will determine if an appropriate ACE is currently associated with the content. If an appropriate ACE is currently associated with the content, then the operating system broker will return the requested content to the application. However, if an appropriate ACE is not currently associated with the content, then the operating system broker may either not return the content or may return the content along with some indication that the content may have been tampered with.

Section II describes an example system that provides runtime integrity protection of the components of an application and of application-generated content in accordance with embodiments. Section III describes exemplary methods for providing runtime integrity protection of the components of an application and of application-generated content in accordance with embodiments. Section IV describes an example mobile device that provides runtime application integrity protection in accordance with techniques described herein. Section V describes an example desktop computer that provides runtime application integrity protection in accordance with techniques described herein. Section VI provides some concluding remarks.

II. Example System for Providing Runtime Application Integrity Protection

Figure 1:
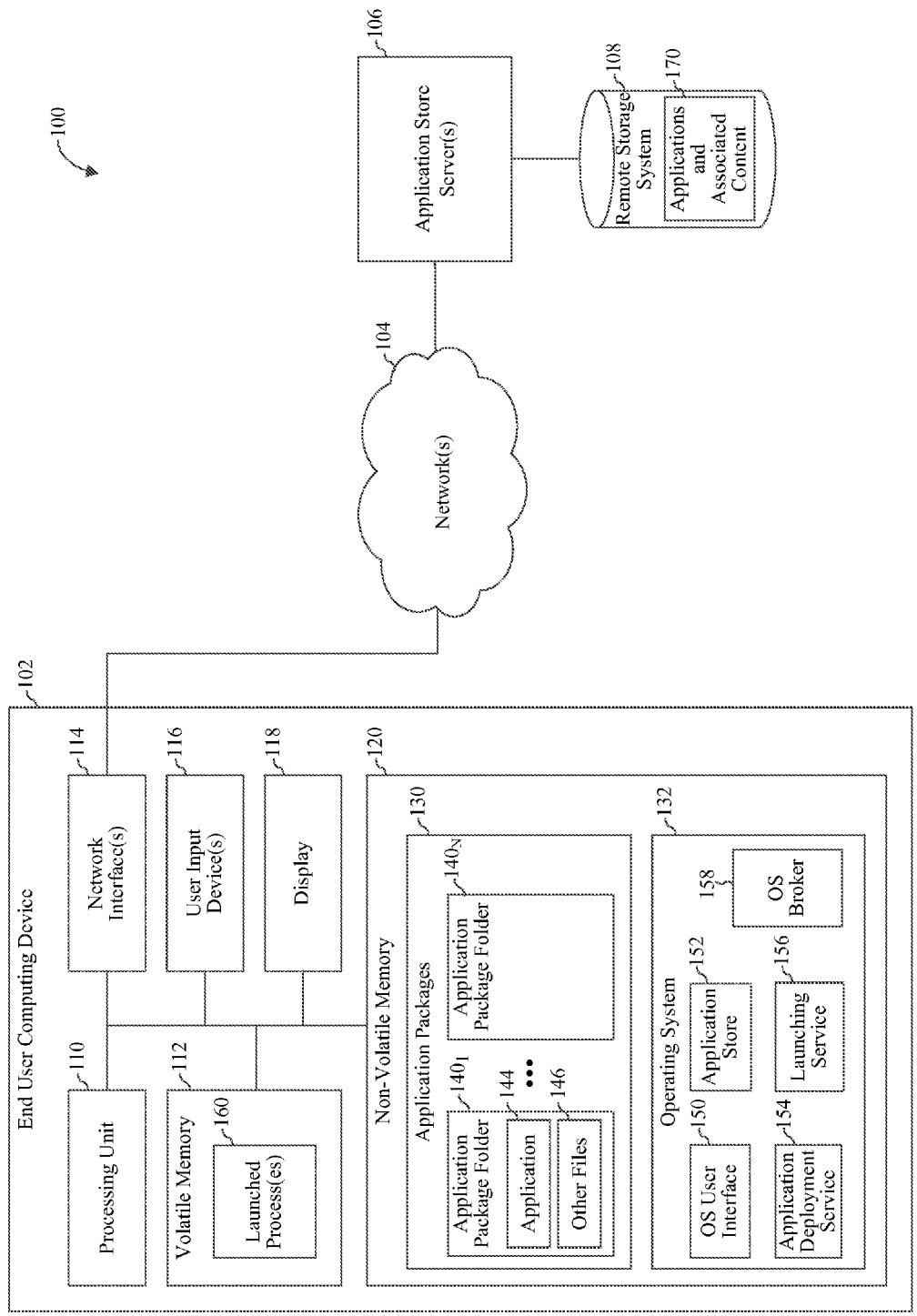
FIG. 1 is a block diagram of a system that provides runtime integrity protection of components of an application and of application-generated content in accordance with embodiments.

FIG. 1 is a block diagram of an example system 100 that provides runtime integrity protection of components of an application and of application-generated content in accordance with embodiments. As shown in FIG. 1, system 100 includes an end user computing device 102 that is communicatively connected to one or more application store servers 106 via one or more networks 104. Each of these components will now be described.

End user computing device 102 is intended to represent a processor-based electronic device that is capable of executing one or more software applications that are installed thereon. Such applications may be executed on behalf of a user of end user computing device 102. In one embodiment, end using computing device 102 comprises a mobile computing device such as a mobile phone (e.g., a smart phone), a laptop computer, a tablet computer, a netbook, a wearable computer such as a smart watch or a head-mounted computer, a portable media player, a handheld game console, a personal digital assistant, a personal navigation assistant, a camera, or any other mobile device capable of executing software applications on behalf of a user. One example of a mobile device that may incorporate the functionality of end user computing device 102 will be discussed below in reference to FIG. 11. In another embodiment, end user computing device 102 comprises a desktop computer or other non-mobile computing platform that is capable of executing software applications. An example desktop computer that may incorporate the functionality of end user computing device 102 will be discussed below in reference to FIG. 12.

End user computing device 102 is capable of communicating with application store server(s) 106 via network 104. Application store server(s) 106 comprise one or more computers that are programmed to support an application store model for distributing software applications to end user computing devices, such as end user computing device 102. For example, application store server(s) 106 may operate to transmit information about applications available for download to end user computing device 102 and may also transmit selected applications to end user computing device 102 for installation thereon. Applications and associated content 170 that are made available for distribution by application store server(s) 106 may be stored in a remote storage system 108. Depending upon the implementation, remote storage system 108 may comprise is an integrated part of application store server(s) 106 or may be communicatively connected thereto.

Network(s) 104 is intended to represent any type of network or combination of networks suitable for facilitating communication between end user computing devices, such as end user computing device 102, and application store server(s) 106. Network(s) 104 may include, for example and without limitation, a wide area network, a local area network, a private network, a public network, a packet network, a circuit-switched network, a wired network, and/or a wireless network.

As further shown in FIG. 1, end user computing device 102 includes a plurality of interconnected components, including a processing unit 110, non-volatile memory 120, volatile memory 112, one or more user input devices 116, a display 118, and one or more network interfaces 114. Each of these components will now be described.

Processing unit 110 is intended to represent one or more microprocessors, each of which may have one or more central processing units (CPUs) or microprocessor cores. Processing unit 110 operates in a well-known manner to execute computer programs (also referred to herein as computer program logic). The execution of such computer programs causes processing unit 110 to perform operations including operations that will be described herein. Each of non-volatile memory 120, volatile memory 112, user input device(s) 116, display 118, and network interface(s) 114 is connected to processing unit 110 via one or more suitable interfaces.

Non-volatile memory 120 comprises one or more computer-readable memory devices that operate to store computer programs and data in a persistent manner, such that stored information will not be lost even when end user computing device 102 is without power or in a powered down state. Non-volatile memory 120 may be implemented using any of a wide variety of non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives.

Volatile memory 112 comprises one or more computer-readable memory devices that operate to store computer programs and data in a non-persistent manner, such that the stored information will be lost when end user computing device 102 is without power or in a powered down state. Volatile memory 112 may be implemented using any of a wide variety of volatile computer-readable memory devices including, but not limited to, random access memory (RAM) devices.

Display 118 comprises a device to which content, such as text and images, can be rendered so that it will be visible to a user of end user computing device 102. Some or all of the rendering operations required to display such content may be performed at least in part by processing unit 110. Some or all of the rendering operations may also be performed by a display device interface such as a video or graphics chip or card (not shown in FIG. 1) that is coupled between processing unit 110 and display 118. Depending upon the implementation of end user computing device 102, display 118 may comprise a device that is integrated within the same physical structure or housing as processing unit 110 or may comprise a monitor, projector, or other type of device that is physically separate from a structure or housing that includes processing unit 110 and connected thereto via a suitable wired and/or wireless connection.

User input device(s) 116 comprise one or more devices that operate to generate user input information in response to a user's manipulation or control thereof. Such user input information is passed via a suitable interface to processing unit 110 for processing thereof. Depending upon the implementation, user input device(s) 116 may include a touch screen (e.g., a touch screen integrated with display 118), a keyboard, a keypad, a mouse, a touch pad, a trackball, a joystick, a pointing stick, a wired glove, a motion tracking sensor, a game controller or gamepad, or a video capture device such as a camera. However, these examples are not intended to be limiting and user input device(s) 116 may include other types of devices other than those listed herein. Depending upon the implementation, each user input device 116 may be integrated within the same physical structure or housing as processing unit 110 (such as an integrated touch screen, touch pad, or keyboard on a mobile device) or physically separate from a physical structure or housing that includes processing unit 110 and connected thereto via a suitable wired and/or wireless connection.

Network interface(s) 114 comprise one or more interfaces that enable end user computing device to communicate over one or more networks 104. For example, network interface (s) 114 may comprise a wired network interface such as an Ethernet interface or a wireless network interface such as an IEEE 802.11 ("Wi-Fi") interface. However, these are examples only and are not intended to be limiting.

As further shown in FIG. 1, non-volatile memory 120 stores a number of software components including a plurality of application packages 130 and an operating system 132. Each application package in the plurality of application packages 130 is stored in a corresponding application package folder $140_1$-$140_N$. In one embodiment, each application package folder $140_1$-$140_N$ is stored in a unique directory within a file system implemented using non-volatile memory 120.

Each application package includes an application and other files associated with the application. For example, as shown in FIG. 1, application package folder $140_1$ includes an application 144. In one embodiment, application 144 comprises a file that includes object code that can be executed by processing unit 110 of end user computing device 102, thereby causing certain operations to be performed, wherein the type of operations performed will vary depending upon how the application is programmed. Application 144 may represent, for example and without limitation, a telephony application, an e-mail application, a messaging application, a Web browsing application, a calendar application, a utility application, a game application, a social networking application, a music application, a productivity application, a lifestyle application, a reference application, a travel application, a sports application, a navigation application, a healthcare and fitness application, a news application, a photography application, a finance application, a business application, an education application, a weather application, a books application, a medical application, or the like.

In addition to application 144, application package folder $140_1$ also includes other files 146 associated with application 144. For example and without limitation, such other files may include an image or tile that can be used to represent application 144 in the context of a graphical user interface (GUI) of end user computing device 102, one or more resources that may be used by application 144 (for example, a settings file that may be used by application 144), and a package manifest that describes the contents of application package 144 in a format that can be understood by operating system 132. However, these examples are not intended to be limiting and other files 146 may include additional files and/or different files than those mentioned above.

The application packages stored in application package folders $140_1$-$140_N$ may be distributed to and/or installed on end user computing device 102 in a variety of ways, depending upon the implementation. For example, in one embodiment, at least one application package is downloaded from application store server(s) 106 and installed on end user computing device 102 by operating system 132. In another embodiment in which end user device 102 is utilized as part of or in conjunction with an enterprise network, at least one application package is distributed to end user computing device 102 by a system administrator using any of a variety of enterprise network management tools and then installed on end user computing device 102 by operating system 132. In yet another embodiment, at least one application package is installed on end user computing device 102 by a system builder, such as by an original equipment manufacturer (OEM) or embedded device manufacturer, using any of a variety of suitable system builder utilities. In a further embodiment, an operating system manufacturer may include an application package along with an operating system that is installed on end user computing device 102. In a still further embodiment in which end user computing device 102 comprises a developer machine, a developer may install an application package on end user computing device 102.

Operating system 132 comprises a set of programs that manage resources and provide common services for applications that are executed on end user computing device 102. As shown in FIG. 1, operating system 132 includes an operating system (OS) user interface 150, an application store 152, an application deployment service 154, a launching service 156, and an operating system (OS) broker 158. Although operating system 132 is shown as being stored in non-volatile memory 120, it is to be understood that during operation of end user computing device 102, operating system 132 or portions thereof are loaded to volatile memory 112 and are executed therefrom as system processes by processing unit 110. Each of the components of operating system 132 will now be described.

OS user interface 150 comprises a component of operating system 132 that generates a user interface by which a user can interact with operating system 132 for various purposes, such as but not limited to finding and launching applications, invoking certain operating system functionality, and setting certain operating system settings. In one embodiment, OS user interface 150 comprises a touch-screen based graphical user interface (GUI), although this is only an example. In further accordance with such an example, each application installed on end user computing device may be represented as an icon or tile within the GUI and invoked by a user through touch-screen interaction with the appropriate icon or tile. However, any of a wide variety of alternative user interface models may be used by OS user interface 150.

Application store 152 comprises a component of operating system 132 that is accessible to a user of end user computing device 102 (e.g., via OS user interface 150). Application store 152 enables a user of end user computing device 102 to interact with application store server(s) 106 for the purposes of purchasing or otherwise obtaining applications for downloading to and installation upon end user computing device 102. Application store 152 may further enable a user to browse through different categories of applications (such as, for example, productivity, multimedia and games), to view descriptive information and product reviews concerning applications, to submit reviews of installed applications, to install updates to installed applications, to redeem gift cards and coupons toward the purchase of applications, and perform other functions relating to browsing, downloading, installing and maintaining applications.

Application deployment service 154 comprises a component of operating system 132 that may be invoked to perform operations relating to the installation of an application that has been purchased or otherwise obtained from application store server(s) 106 (or that has been obtained via other means, such as the other means described above). In one embodiment, these operations include storing an application package within a corresponding application folder $140_1$-$140_N$. As will be discussed in more detail herein, application deployment service 154 may also associate certain information with an application package at the time of installation, wherein the information specifies one or more levels of permission required to perform one or more actions with respect to the contents of the application package. For example, the information may specify a certain level of permission that is required to update the contents of an application package. In the following, this information will be referred to as an "access control entry" (ACE), although this terminology is not intended to be limiting and other terms may be used to describe this information. In one embodiment, application deployment service 154 stores the ACE in file system metadata associated with a root directory of a file system folder in which the application package is stored, although a variety of other methods may be used to associate an ACE with the contents of the application package.

In one embodiment, application deployment service 154 comprises a protected process. Generally speaking, the term "protected process" is used herein to describe a process to which access by other processes is restricted in some manner by an operating system, such as operating system 132. In accordance with a particular embodiment, operating system 132 will ensure that other processes cannot inject a thread into a protected process, access the virtual memory of a protected process, debug a protected process (which means that users including administrators and users running as System cannot attach debuggers to the protected process), duplicate a handle from a protected process, or change a quota or working set of a protected process. Operating system 132 may also constrain the types of operations that other processes can perform on a thread of a protected process. By treating application deployment service 154 as a protected process, operating system 132 can help deter tampering with application deployment service 154 so long as operating system 132 remains in an uncompromised state. Further details concerning the manner of operation of application deployment service 154 will be provided in the following section.

Launching service 156 comprises a component of operating system 132 that may be invoked to launch an application for execution by processing unit 110. Launching service 156 may be invoked as a part of any of a plurality of different application launching protocols (e.g., direct launch, share, protocol launch, or the like). Launching service 156 launches an application by creating a corresponding launched process 160 in volatile memory 112 and initializing it. After launching service 156 initializes the process associated with the application, the application is executed within the process.

In accordance with embodiments, launching service 156 is further configured to perform operations to validate the content of an application at the time launching service is invoked to launch the application, but before launching service 156 has actually launched the application. For example, launching service 156 may be configured to determine whether any ACE or an expected ACE has been associated with the contents of the application package of which the application is a part prior to launching the application. For example, launching service 156 may determine whether any ACE or an expected ACE has been associated with a root directory of a file system folder in which the application package is stored. If the ACE is missing, or if the ACE does not match an expected ACE, then launching service 156 may fail to create the application's process and may also disable the application from further launch attempts in the future. Further details concerning the manner of operation of launching service 156 will be provided in the following section.

Operating system (OS) broker 158 comprises a component of operating system 132 that is configured to assist applications in protecting the integrity of content that has been generated by the applications and stored in non-volatile memory 120 of end user computing device 102. In particular, OS broker 158 may be invoked by an application to associate an ACE with content that has been created by the application. OS broker 158 may associate the ACE with the content at the time such content is first stored in non-volatile memory 120. In accordance with embodiments, the ACE may be stored in file system metadata associated with the content itself or with a folder in which the content is stored. In an embodiment, OS broker 158 comprises a protected process as that term was previously defined herein.

OS broker 158 may later be invoked by the same application to retrieve the same content from non-volatile memory 120. At the time of retrieval, OS broker 158 operates to determine if any ACE or an expected ACE is associated with the requested content. If any ACE or an expected ACE is associated with the requested content, then OS broker 158 will return the requested content to the application and may optionally return an indication that the requested content has not been tampered with. However, if no ACE or no expected ACE is associated with the content, then OS broker 158 may either not return the requested content to the application or may return the requested content along with some indication that the requested content may have been tampered with. Further details concerning the manner of operation of OS broker 158 will be provided in the following section.

III. Example Methods for Providing Runtime Application Integrity Protection

Figure 2:
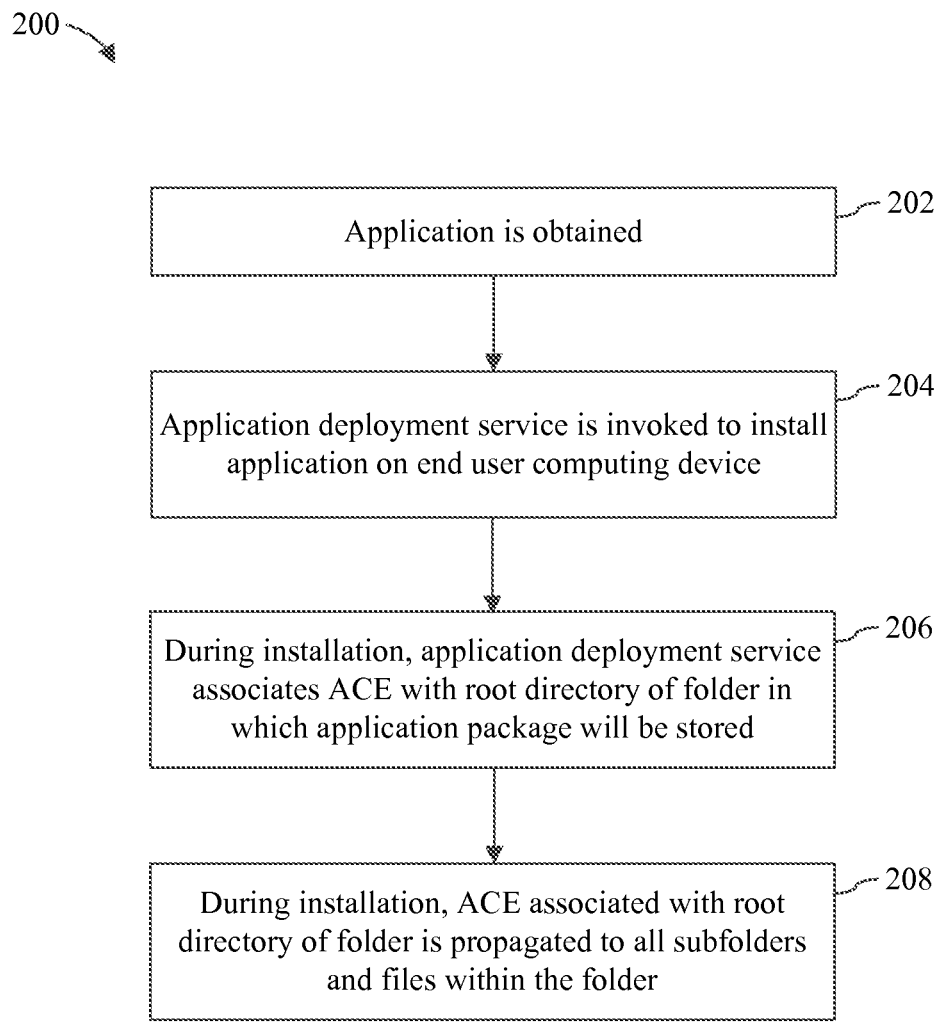
FIG. 2 depicts a flowchart of a method for associating an access control entry (ACE) with one or more application components in accordance with an embodiment.

FIG. 2 depicts a flowchart 200 of a method for associating an access control entry (ACE) with one or more application components in accordance with an embodiment. The method of flowchart 200 may be performed, for example, by end user computing device 102 as discussed above in reference to FIG. 1. Accordingly, the method of flowchart 200 will now be described with continued reference to system 100 of FIG. 1. However, the method is not limited to that implementation.

As shown in FIG. 2, the method of flowchart 200 begins at step 202 in which an application is obtained. Step 202 may involve, for example, a user interacting with application store 152 on end user computing device 102 to selectively obtain or purchase an application, which is then downloaded from application store server(s) 106 for installation upon end user computing device 102. The application is received in the form of an application package which includes the application itself and certain additional files associated with the application.

Other methods may be used to obtain the application in step 202. For example, in an embodiment in which end user device 102 is utilized as part of or in conjunction with an enterprise network, an application package that includes the application and associated files may be distributed to end user computing device 102 for installation thereon by a system administrator using any of a variety of enterprise network management tools. In yet another embodiment, an application package that includes the application and associated files may be obtained for installation on end user computing device 102 by a system builder, such as by an OEM or embedded device manufacturer, using any of a variety of suitable system builder utilities. In a further embodiment, an operating system manufacturer may obtain an application package that includes the application and associated files for installation along with an operating system on end user computing device 102. In a still further embodiment in which end user computing device 102 comprises a developer machine, a developer may obtain an application package that includes the application and associated files for installation on end user computing device 102.

At step 204, an application deployment service is invoked to install the application on the end user computing device. For example, step 204 may comprise invoking application deployment service 154 of operating system 132 to install the application on end user computing device 102. Application deployment service 154 may be called to perform this function by another process executing on end user computing device 102, such as a process associated with application store 152, an installer process, or some other process that is configured to cause applications to be installed on end user computing device 102. As noted above, application deployment service 154 may comprise a protected process.

At step 206, during the installation of the application, the application deployment service associates an ACE with a root directory of a folder in which an application package that includes the application will be stored on the end user computing device. For example, application deployment service 154 may perform step 206 by storing an application package that includes the application in a folder of a file system on end user computing device 102. Application deployment service 154 then associates an ACE with a root directory of the file folder. Application deployment service 154 may perform this function by storing the ACE as part of file system metadata that is associated with the root directory.

At step 208, also during the installation of the application, the ACE that was associated with the root directory of the folder during step 206 is propagated to all subfolders and files within the folder as such subfolders and files are stored on the end user computing device. This step may entail storing a similar ACE in file system metadata associated with each subfolder and file within the root directory. In one embodiment, the propagation of the ACE is performed by a file system of end user computing device 102 as part of a standard process for creating subfolders and files within a root directory. Alternatively, the propagation of the ACE may be performed by application deployment service 154 or some other software component on end user computing device 102.

As a result of the foregoing method of flowchart 200, an ACE is stored in association with each of the application components included in the application package. The ACE may specify one or more levels of permission required to perform one or more actions with respect to at least one of the application components. For example, the ACE may specify that a certain level of permission is required to read, write or delete objects in the folder in which the application package is stored. In accordance with this example, any process that does not have the requisite level of permission cannot read, write or delete objects in the application package folder. As another example, the ACE may specify that a certain level of permission is required to write objects in the application package folder. However, any process that does not have the necessary level of permission can still read or delete objects from the folder. Such an implementation may be desired for backward compatibility reasons. For example, such an implementation may be desired if there are unprotected processes that should still have read access to the application package folder (e.g., file backup programs) or delete access to the application package folder (e.g., uninstall or anti-malware programs).

Figure 3:
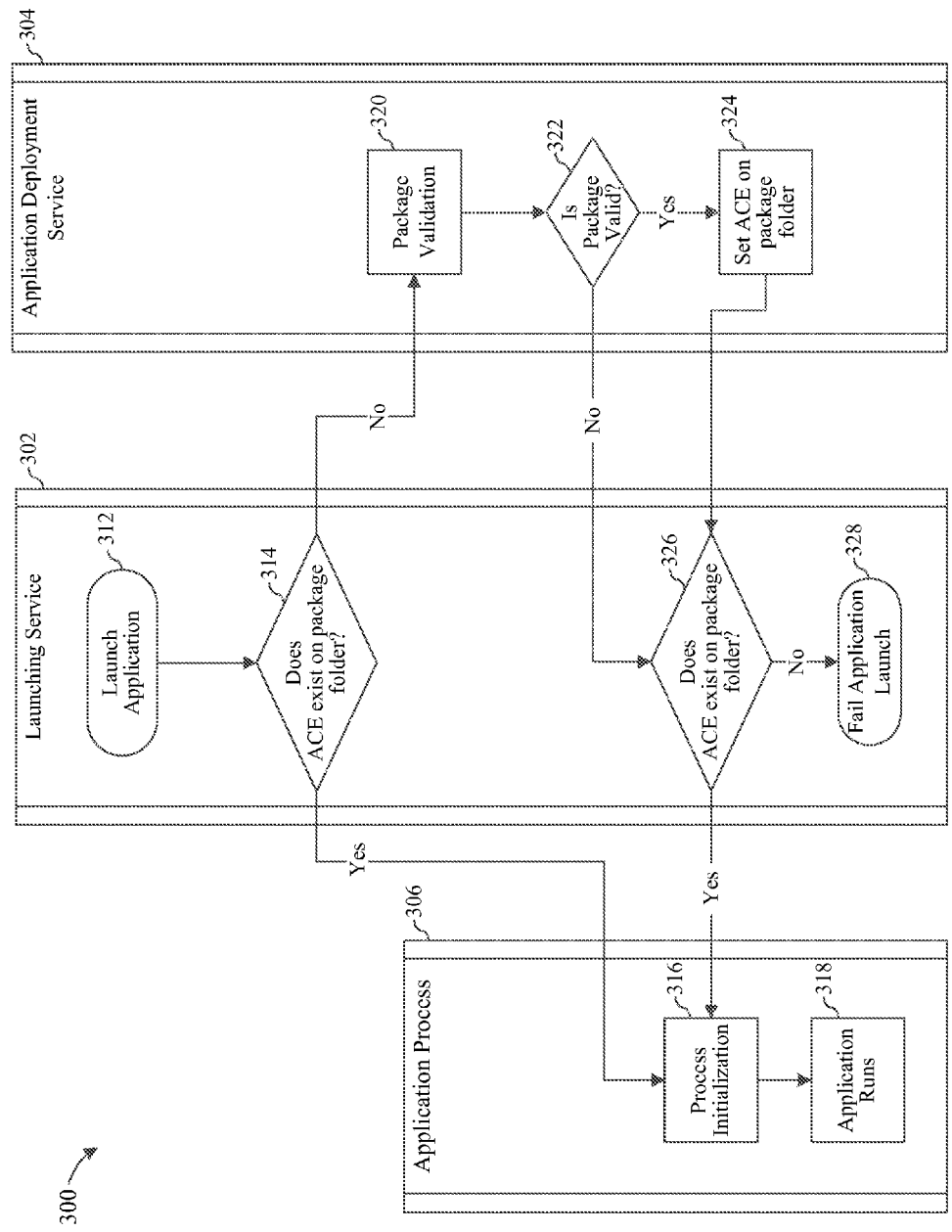
FIG. 3 depicts a flowchart of a method for providing runtime application integrity protection in accordance with an embodiment.

FIG. 3 depicts a flowchart 300 of a method for providing runtime application integrity protection in accordance with an embodiment. The method of flowchart 300 may be performed, for example, by end user computing device 102 as discussed above in reference to FIG. 1. Accordingly, the method of flowchart 300 will now be described with continued reference to system 100 of FIG. 1. However, the method is not limited to that implementation.

As will be made evident by the description below, certain steps of flowchart 300 are performed by a launching service 302 (which may comprise, for example, launching service 156 of FIG. 1), certain steps are performed by an application deployment service 304 (which may comprise, for example, application deployment service 154 of FIG. 1), and certain steps are performed as part of an application process 306 (which may comprise, for example, a process associated with application 144 of FIG. 1).

As shown in FIG. 3, the method of flowchart 300 begins at step 312 in which launching service 302 is invoked to launch an application. Launching service 302 may be invoked as a part of any of a plurality of different application launching protocols (e.g., direct launch, share, protocol launch, or the like).

At decision step 314, launching service 302 determines if an ACE exists on the application package folder in which the application to be launched is stored. In an embodiment, this step comprises determining if an ACE exists in association with a root directory of the application package folder.

In accordance with one implementation, checking if the ACE exists on the application package folder comprises checking if any ACE exists on the application package folder. In accordance with an alternate implementation, checking if the ACE exists on the application package folder comprises checking if an expected ACE exists on the application package folder (e.g., checking if an ACE exists on the application package folder that specifies an expected level or levels of permission that are required to perform an expected action or actions).

In embodiments, the presence of a valid ACE on the application package folder comprises an indicia that the contents of the application package folder have not been tampered with. For example, if only a protected process such as deployment service 304 can assign an ACE to an application package folder and if the ACE that was originally applied to the application package folder specifies that only a protected process can write to that folder, then the continued presence of the ACE on the application package folder provides a very high level of assurance that the contents thereof have not been tampered with. For example, if a user tried to use an unprotected process to delete the application package folder and replace it with a new application package folder, the new application package folder would not have an ACE associated with it, since the unprotected process would not be capable of assigning an ACE to the new application package folder.

If launching service 302 determines during decision step 314 that an ACE exists on the application package folder, then launching service 302 causes application process 306 to be launched and, at step 316, application process 306 is initialized. After application process 306 is initialized, then the application runs within application process 306 as shown at step 318.

However, if launching service 302 determines during step 314 that no ACE (or an unexpected ACE) exists in association with the application package folder, then application deployment service 304 is called to validate the application package as shown at step 320. Any of a wide variety of methods may be used to validate the application package.

For example, in one embodiment, validating the application package comprises determining a hash value for each file currently stored in the application package folder by applying a cryptographic hash function thereto, and then comparing the determined hash value for each file to a corresponding hash value stored in a digitally-signed file that was received as part of the original application package. In accordance with one particular embodiment, the cryptographic hash function comprises a SHA-256 cryptographic hash function, although a wide variety of other cryptographic hash functions may be used.

In further accordance with such an embodiment, if the determined hash value for every file in the application package folder matches the corresponding hash value from the digitally-signed file, then the application package is determined to be valid. However, if there is a mismatch between the determined hash value for at least one file in the application package folder and the corresponding hash value from the digitally-signed file, then the application package is determined to be invalid.

After the application package is validated by application deployment service 304 at step 320, the results of the validation process are examined at decision step 322. If the application package is determined to be valid during decision step 322, then application deployment service 304 associates an ACE with the application package folder as shown at step 324. After this, control flows to launching service 302 which performs decision step 326. If the application package is determined to be invalid during decision step 322, then step 324 is not performed by application deployment service 304 and control flows directly to launching service 302 which performs decision step 326.

At decision step 326, launching service 302 once again determines if an ACE exists on the application package folder in which the application is stored. This step may be performed in a like manner to previously-described decision step 314.

If launching service 302 determines during decision step 326 that an ACE exists on the application package folder, then launching service 302 causes application process 306 to be launched and, at step 316, application process 306 is initialized. After application process 306 is initialized, then the application runs within application process 306 as shown at step 318.

However, if launching service 302 determines during decision step 326 that no ACE (or an unexpected ACE) exists in association with the application package folder, then launching service 302 will fail to launch the application. That is to say, launching service 302 will not create application process 306 so that the application can be executed. In this case, launching service 302 may return a failure message or some other message to a process that invoked launching service 302 to launch the application. Such message may indicate that the application cannot be launched and optionally provide some indication of why the application cannot be launched.

In addition to not launching the application, launching service 302 may perform other operations or cause other operations to be performed in response to determining that no ACE (or an unexpected ACE) exists in association with the application package folder. These operations may include, for example, disabling the application from being launched in the future and/or marking the application as requiring repair. In an embodiment in which the application is marked as requiring repair, such repair may be carried out automatically by end user computing device 102 operating in conjunction with application store server(s) 106 to cause a set of updated application package content to be installed on end user computing device 102. Still other methods may be used to repair a compromised application.

Figure 4:
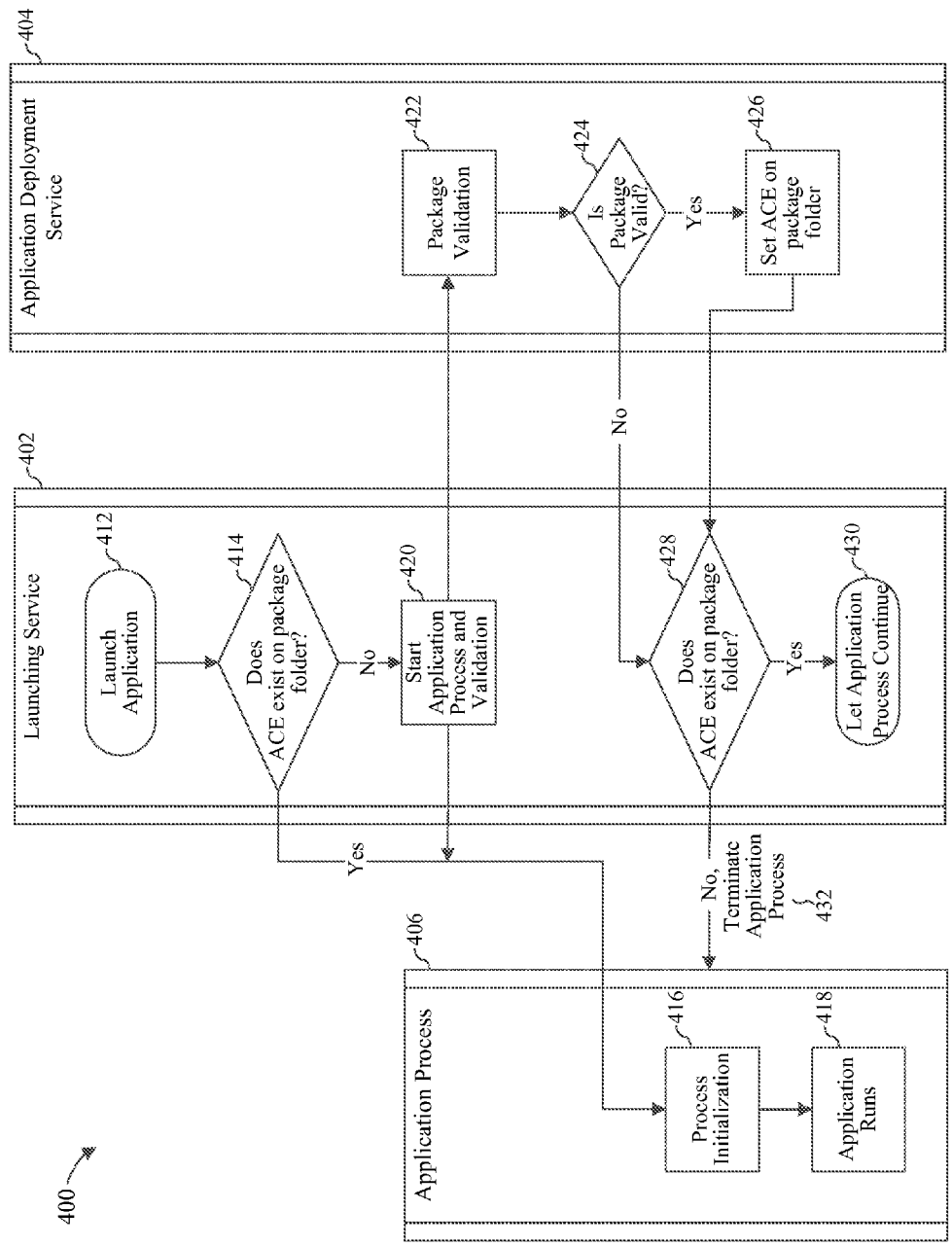
FIG. 4 depicts a flowchart of an alternate method for providing runtime application integrity protection in accordance with an embodiment.

FIG. 4 depicts a flowchart 400 of an alternate method for providing runtime application integrity protection in accordance with an embodiment. The method of flowchart 400 may be performed, for example, by end user computing device 102 as discussed above in reference to FIG. 1. Accordingly, the method of flowchart 400 will now be described with continued reference to system 100 of FIG. 1. However, the method is not limited to that implementation.

As will be made evident by the description below, certain steps of flowchart 400 are performed by a launching service 402 (which may comprise, for example, launching service 156 of FIG. 1), certain steps are performed by an application deployment service 404 (which may comprise, for example, application deployment service 154 of FIG. 1), and certain steps are performed as part of an application process 406 (which may comprise, for example, a process associated with application 144 of FIG. 1).

As shown in FIG. 4, the method of flowchart 400 begins at step 412 in which launching service 402 is invoked to launch an application. Launching service 402 may be invoked as a part of any of a plurality of different application launching protocols (e.g., direct launch, share, protocol launch, or the like).

At decision step 414, launching service 402 determines if an ACE exists on the application package folder in which the application to be launched is stored. This step may be performed in a like manner to decision step 314 as previously described in reference to flowchart 300 of FIG. 3.

If launching service 402 determines during decision step 414 that an ACE exists on the application package folder, then launching service 402 causes application process 406 to be launched and, at step 416, application process 406 is initialized. After application process 406 is initialized, then the application runs within application process 406 as shown at step 418.

However, if launching service 402 determines during step 414 that no ACE (or an unexpected ACE) exists in association with the application package folder, then at step 420 launching service 402 starts application process 406 (which may include initializing the process at step 416 and running the application within the process as shown at step 408) and also calls application deployment service 404 to validate the application package. At step 422, application deployment service 404 validates the application package. Application deployment service 404 may validate the application package using any of a wide variety of methods, including those discussed above in reference to step 320 of flowchart 300.

After the application package is validated by application deployment service 404 at step 422, the results of the validation process are examined at decision step 424. If the application package is determined to be valid during decision step 424, then application deployment service 404 associates an ACE with the application package folder as shown at step 426. After this, control flows to launching service 402 which performs decision step 428. If the application package is determined to be invalid during decision step 424, then step 426 is not performed by application deployment service 404 and control flows directly to launching service 402 which performs decision step 428.

At decision step 428, launching service 402 once again determines if an ACE exists on the application package folder in which the application is stored. This step may be performed in a like manner to previously-described decision step 414.

If launching service 402 determines during decision step 428 that an ACE exists on the application package folder, then launching service 402 allows the previously-initiated application process 406 to continue running. However, if launching service 402 determines during decision step 428 that no ACE (or an unexpected ACE) exists in association with the application package folder, then launching service 402 will terminate or cause to be terminated the previously-initiated application process 406, as shown at step 432. Depending on how quickly certain steps are performed, application process 406 may still be in process initialization 416 or may be running the application 418 at the time it is terminated.

In addition to terminating application process 406, launching service 402 may perform other operations or cause other operations to be performed in response to determining that no ACE (or an unexpected ACE) exists in association with the application package folder. These operations may include, for example, disabling the application from being launched in the future and/or marking the application as requiring repair. In an embodiment in which the application is marked as requiring repair, such repair may be carried out automatically by end user computing device 102 operating in conjunction with application store server(s) 106 to cause a set of updated application package content to be installed on end user computing device 102. Still other methods may be used to repair a compromised application.

As can be seen from the foregoing description of the method of flowchart 400, that method differs from the method of flowchart 300 in that an application will be launched even when the launching service does not find a valid ACE associated with the application package folder. Such application can be terminated later, though, if the application package content doesn't pass muster when validated by the application deployment service. Such an approach may be deemed desirable in a scenario in which a large number of valid applications have been installed by a user base in a manner that did not assign an ACE to the application package folders (e.g., in a scenario in which end user computing devices are migrated from a system that does not rely on ACEs for protecting application protection to a system that does), so as not to required delayed launches for a large number of previously-installed applications over a large user base.

To help further illustrate the inventive concept, FIGS. 5-8 depict flowcharts of a generalized method for providing runtime application integrity protection in accordance with various embodiments. Each of these flowcharts will now be described.

Figure 5:
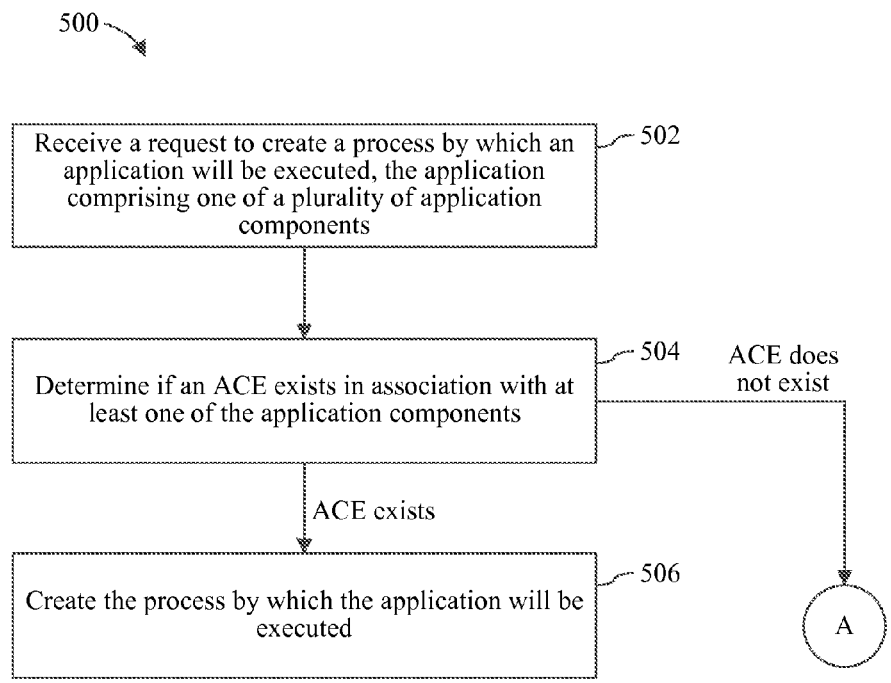
FIG. 5 depicts a flowchart of a method for conditionally creating a process by which an application will be executed in accordance with an embodiment.

FIG. 5 depicts a flowchart 500 of a method for conditionally creating a process by which an application will be executed in accordance with an embodiment. Each of the steps of flowchart 500 may be performed, for example, by launching service 156 of FIG. 1.

As shown in FIG. 5, the method of flowchart begins at step 502, in which a request to create a process by which an application will be executed is received, wherein the application comprises one of a plurality of application components. For example, the application may comprise one file among a number of files that together make up an application package.

At decision step 504, it is determined if an ACE exists in association with at least one of the application components. This step may comprise, for example, determining if any ACE exists in association with at least one of the application components. Alternatively, this step may comprise determining if an ACE that matches an expected ACE exists in association with at least one of the application components.

In one embodiment, determining if the ACE exists in association with at least one of the application components may be performed by determining if the ACE exists in association with a root directory of a folder in which the plurality of application components is stored. However, other methods may be used. For example, in an embodiment in which each file within an application package folder may have its own ACE, step 504 may comprise determining if a separate ACE exists in association with each file in the application package folder.

If it is determined during decision step 504 that an ACE exists in association with at least one of the application components, then a process is created by which the application will be executed, as shown at step 506. However, if it is determined during decision step 504 that an ACE does not exist in association with at least one of the application components, then any one of the methods of flowcharts 600, 700, or 800 may be performed, depending upon the implementation. In the figures, this is indicated by the reference block "A" connecting flowchart 500 to each of flowcharts 600, 700 and 800.

For example, in an embodiment illustrated by FIG. 6, if it is determined during decision step 504 that an ACE does not exist in association with at least one of the application components, then a process by which the application will be executed is not created as shown at step 602. In further accordance with this embodiment, the application may also be disabled from being launched in the future as shown at step 604 and marked as requiring repair as shown in step 606. Each of these steps may be performed or triggered, for example, by launching service 156 of FIG. 1.

In the embodiment illustrated by FIG. 7, if it is determined during decision step 504 that an ACE does not exist in association with at least one of the application components, then a validity of each of the application components is determined at step 702. This may involve, for example, determining a hash value for each file stored in an application package folder by applying a cryptographic hash function thereto, and then comparing the determined hash value for each file to a corresponding hash value stored in a digitally-signed file that was received as part of an original application package. In further accordance with such an embodiment, if the determined hash value for every file in the application package folder matches the corresponding hash value from the digitally-signed file, then the application package is determined to be valid. However, if there is a mismatch between the determined hash value for at least one file in the application package folder and the corresponding hash value from the digitally-signed file, then the application package is determined to be invalid.

If it is determined during decision step 702 that at least one of the application components is invalid, then the process by which the application will be executed is not created as shown at step 704. Additional steps may be performed if it is determined during decision step 702 that at least one of the application components is invalid, such as disabling the application from being launched in the future and/or marking the application as requiring repair.

However, if it is determined during decision step 702 that all of the application components are valid, then an ACE is created in association with at least one of the application components as shown at step 706. Then, at step 708, the process by which the application will be executed is created.

Steps 702 and 706 of flowchart 700 may be performed, for example, by application deployment service 154 of FIG. 1. Steps 704 and 708 of flowchart 700 may be performed, for example, by launching service 156 of FIG. 1.

In the embodiment illustrated by FIG. 8, if it is determined during decision step 504 that an ACE does not exist in association with at least one of the application components, then the process by which the application will be executed is nevertheless created as shown at step 802. Then, during step 804, a validity of each of the application components is determined. This step may be performed, for example, in a like manner to step 702 as described above in reference to FIG. 7. If it is determined that at least one of the application components is invalid during step 804, then the process created during step 802 is terminated. If it is determined that all of the application components are valid during step 804, no action is taken (i.e., the process by which the application will be executed is not terminated).

Step 804 of flowchart 800 may be performed, for example, by application deployment service 154 of FIG. 1. Steps 802 and 806 of flowchart 800 may be performed, for example, by launching service 156 of FIG. 1.

FIG. 9 depicts a flowchart 900 of a method by which an operating system broker may operate to protect the integrity of application-generated content in accordance with an embodiment. The method of flowchart 900 may be performed, for example, by OS broker 158 as discussed above in reference to FIG. 1. Accordingly, the method of flowchart 900 will now be described with continued reference to system 100 of FIG. 1. However, the method is not limited to that implementation.

As shown in FIG. 9, the method of flowchart 900 begins at step 902 in which an OS broker, such as OS broker 158, receives a request from an application, such as application 144, to assign an ACE to content that has been created by the application. Such request may be received by the OS broker after the content has been created by the application and is first stored in non-volatile memory of a computing device, such as non-volatile memory 120 of end user computing device 102. The application-generated content may include, for example, files or data generated by the application. The files and data may include, for example and without limitation, documents (including receipts, word processing documents, notes, or the like), spreadsheets, images, photographs, video files, or the like.

At step 904, in response to receiving the request during step 902, the OS broker assigns an ACE to the content. As discussed elsewhere herein, the ACE may comprise information that specifies one or more levels of permission required to perform one or more actions with respect to the application-generated content. OS broker may comprise one of a limited number of protected processes that is capable of assigning ACEs to objects in this manner. In one embodiment, the OS broker assigns an ACE to the application-generated content by storing the ACE in file system metadata associated with the content itself or with a folder in which the content is stored.

FIG. 10 depicts a flowchart 1000 of a method by which an operating system broker may further operate to protect the integrity of application-generated content in accordance with an embodiment. Like the method of flowchart 900, the method of flowchart 1000 may be performed, for example, by OS broker 158 as discussed above in reference to FIG. 1. Accordingly, the method of flowchart 1000 will now be described with continued reference to system 100 of FIG. 1. However, the method is not limited to that implementation.

As shown in FIG. 10, the method of flowchart 1000 begins at step 1000 in which an OS broker, such as OS broker 158, receives a request from an application, such as application 144, to obtain application-generated content that was previously stored by the OS broker on behalf of the application. Such application-generated content may have been stored, for example, in non-volatile memory 120 of end user computing device 102.

In response to receiving the request, the OS broker determines if a valid ACE is currently assigned to the application-generated content as shown at step 1004. This step may comprise determining if any ACE is currently assigned to the application-generated content or determining if an expected ACE is currently assigned to the application-generated content. Furthermore, determining if a valid ACE is assigned to the application-generated content may comprise determining if an ACE exists in file system metadata that is associated with the application-generated content.

If the OS broker determines that a valid ACE is assigned to the application-generated content, then the OS broker will provide the application-generated content to the application for use thereby as shown at step 1006. However, if the OS broker determines that a valid ACE is not assigned to the application-generated content, then the OS broker will either not provide the application-generated content to the application or will provide the application-generated content to the application along with one or more notifiers, warnings or other indicia that the application-generated content may have been tampered with or compromised in some manner.

IV. Example Mobile Device Implementation

FIG. 11 is a block diagram of an exemplary mobile device 1102 that may implement embodiments described herein. As shown in FIG. 11, mobile device 1102 includes a variety of optional hardware and software components. Any component in mobile device 1102 can communicate with any other component, although not all connections are shown for ease of illustration. Mobile device 1102 can be any of a variety of computing devices (e.g., cell phone, smartphone, handheld computer, Personal Digital Assistant (PDA), etc.) and can allow wireless two-way communications with one or more mobile communications networks 1104, such as a cellular or satellite network, or with a local area or wide area network.

The illustrated mobile device 1102 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components of mobile device 1102 and support for one or more application programs 1114 (also referred to as "applications" or "apps"). Application programs 114 may include common mobile computing applications (e.g., e-mail applications, calendars, contact managers, Web browsers, messaging applications) and any other computing applications (e.g., word processing applications, mapping applications, media player applications).

The illustrated mobile device 1102 can include memory 1120. Memory 1120 can include non-removable memory 1122 and/or removable memory 1124. Non-removable memory 1122 can include RAM, ROM, flash memory, a hard disk, or other well-known memory devices or technologies. Removable memory 1124 can include flash memory or a Subscriber Identity Module (SIM) card, which is well known in GSM communication systems, or other well-known memory devices or technologies, such as "smart cards." Memory 1120 can be used for storing data and/or code for running operating system 1112 and applications 1114. Example data can include Web pages, text, images, sound files, video data, or other data to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1102 can support one or more input devices 1130, such as a touch screen 1132, a microphone 1134, a camera 1136, a physical keyboard 1138 and/or a trackball 1140 and one or more output devices 1150, such as a speaker 1152 and a display 1154. Touch screens, such as touch screen 1132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1132 and display 1154 can be combined in a single input/output device. The input devices 1130 can include a Natural User Interface (NUI).

Wireless modem(s) 1160 can be coupled to antenna(s) (not shown) and can support two-way communications between the processor 1110 and external devices, as is well understood in the art. The modem(s) 1160 are shown generically and can include a cellular modem 1166 for communicating with the mobile communication network 1104 and/or other radio-based modems (e.g., Bluetooth 1164 and/or Wi-Fi 1162). At least one of the wireless modem(s) 1160 is typically configured for communication with one or more cellular networks, such as a GSM network for data and voice communications within a single cellular network, between cellular networks, or between the mobile device and a public switched telephone network (PSTN).

Mobile device 1102 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components of mobile device 1102 are not required or all-inclusive, as any components can be deleted and other components can be added as would be recognized by one skilled in the art.

In an embodiment, certain components of mobile device 1102 are configured to perform the runtime application integrity protection functions described in preceding sections. For example, in one embodiment, operating system 1112 includes components (such as application deployment service 154, launching service 156 and OS broker 158) that are capable of performing the functions described above for protecting at runtime the integrity of applications 1114 and content generated by such applications. However, this is only an example and different functions may be performed by different components.

Computer program logic for performing the runtime application integrity protection functions described above may be stored in memory 1120 and executed by processor 1110. By executing such computer program logic, processor 1110 may be caused to implement any of the features of any of the components of end user computing device 102 as described above in reference to FIG. 1. Also, by executing such computer program logic, processor 1110 may be caused to perform any or all of the steps of any or all of the flowcharts depicted in FIGS. 2-10.

V. Example Computer System Implementation

FIG. 12 depicts an example processor-based computer system 1200 that may be used to implement various embodiments described herein. For example, system 1200 may be used to implement any of the components of system 100 as described above in reference to FIG. 1. System 1200 may also be used to implement any or all of the steps of any or all of the flowcharts depicted in FIGS. 2-10. The description of system 1200 provided herein is provided for purposes of illustration, and is not intended to be limiting. Embodiments may be implemented in further types of computer systems, as would be known to persons skilled in the relevant art(s).

As shown in FIG. 12, system 1200 includes a processing unit 1102, a system memory 1204, and a bus 1206 that couples various system components including system memory 1204 to processing unit 1202. Processing unit 1202 may comprise one or more microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of system 100 as described above in reference to FIG. 1. The program modules may also include computer program logic that, when executed by processing unit 1202, performs any of the steps or operations shown or described in reference to the flowcharts of FIGS. 2-10.

A user may enter commands and information into system 1200 through input devices such as a keyboard 1238 and a pointing device 1240. Other input devices (not shown) may include a microphone, joystick, game controller, scanner, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

A display 1244 is also connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface or adapter 1250, a modem 1252, or other suitable means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable computer 1200 to implement features of embodiments of the present invention discussed herein. Accordingly, such computer programs represent controllers of the system 1200.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1200 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for protecting application integrity at runtime, comprising:
    receiving a request to create a process by which an application will be executed, the application comprising one of a plurality of application components;
    based at least on receiving the request:
        determining, by one or more hardware processors, whether an access control entry (ACE) exists in association with at least one of the application components, the ACE specifying one or more levels of permission required to perform one or more actions with respect to at least one of the application components, the ACE being created by a protected process that comprises a process to which access by other processes is restricted; and
        based at least on determining that the ACE exists in association with the at least one of the application components, creating the process by which the application will be executed.

2. The method of claim 1, wherein the plurality of application components comprises the application and one or more files associated with the application.

3. The method of claim 1, wherein determining whether the ACE exists in association with at least one of the application components comprises:

determining whether an ACE that matches an expected ACE exists in association with at least one of the application components.

4. The method of claim 1, wherein determining whether the ACE exists in association with at least one of the application components comprises:
determining whether the ACE exists in association with a root directory of a folder in which the plurality of application components are stored.

5. The method of claim 1, further comprising, based at least on determining that the ACE does not exist in association with at least one of the application components:
not creating the process by which the application will be executed.

6. The method of claim 5, further comprising, based at least on determining that the ACE does not exist in association with at least one of the application components, performing one or more of:
disabling the application from being launched in the future; and
marking the application as requiring repair.

7. The method of claim 1, further comprising, based at least on determining that the ACE does not exist in association with at least one of the application components:
determining a validity of each of the application components; and
based at least on determining that at least one of the application components is invalid, not creating the process by which the application will be executed.

8. The method of claim 7, wherein each of the application components comprises a file received as part of an application package and wherein determining a validity of each of the application components comprises:
determining a hash value for each of the files in the application package; and
comparing the determined hash value for each of the files in the application package to a corresponding hash value stored in a digitally-signed file included in the application package.

9. The method of claim 7, further comprising, based at least on determining that each of the application components is valid:
creating the process by which the application will be executed.

10. The method of claim 9, further comprising, based at least on determining that each of the application components is valid:
creating an ACE in association with the at least one of the application components.

11. The method of claim 1, further comprising, based at least on determining that the ACE does not exist in association with at least one of the application components:
creating the process by which the application will be executed;
determining a validity of each of the application components; and
based at least on determining that at least one of the application components is invalid, terminating the process.

12. The method of claim 1, further comprising allowing only protected processes to create an ACE in association with a resource.

13. A system, comprising:
at least one processor; and
a memory that stores computer program logic for execution by the at least one processor, the computer program logic including a plurality of components configured to perform operations when executed by the at least one processor, the plurality of components including:
a first operating system component that is configured to receive a request to create a process by which an application will be executed, the application comprising one file among a plurality of files in an application package, and based at least on receiving the request, determine whether an access control entry (ACE) exists in association with at least one of the files in the application package, the ACE specifying one or more levels of permission required to perform one or more actions with respect to at least one of the files in the application package, the ACE being created by a protected process that comprises a process to which access by other processes is restricted;
the first operating system component being further configured to, based at least on determining that the ACE exists in association with the at least one of the files in the application package, create the process by which the application will be executed.

14. The system of claim 13, wherein the plurality of components further includes:
a second operating system component that is configured to, based at least on a determination that the ACE does not exist in association with at least one of the files in the application package, determine a validity of each of the files in the application package;
the first operating system component being further configured to, based at least on a determination that at least one of the files in the application package is invalid, not create the process by which the application will be executed and, based at least on a determination that each of the files in the application package is valid, create the process by which the application will be executed.

15. A method for protecting the integrity of application-generated content, comprising:
receiving by an operating system broker of an operating system, which is at least partially implemented by a hardware processor, a request from an application to assign an access control entry (ACE) to content that has been created by the application, the ACE specifying one or more levels of permission required to perform one or more actions with respect to the content; and
based at least on receiving the request, assigning by the operating system broker the ACE to the content;
the operating system broker comprising a process to which access by other processes is restricted.

16. The method of claim 15, further comprising:
receiving by the operating system broker a request from the application to obtain the content; and
based at least on receiving the request from the application to obtain the content, determining whether a valid ACE is assigned to the content.

17. The method of claim 16, further comprising:
based at least on determining that a valid ACE is assigned to the content, providing the content to the application.

18. The method of claim 16, further comprising:
based at least on determining that a valid ACE is not assigned to the content, not providing the content to the application.

19. The method of claim 16, further comprising:
based at least on determining that a valid ACE is not assigned to the content, providing the content to the application along with an indication that the content may have been tampered with.

\* \* \* \* \*